United States Patent
Takeda

(10) Patent No.: US 12,363,103 B2
(45) Date of Patent: Jul. 15, 2025

(54) MOBILE TERMINAL, CONTROL METHOD, AND STORAGE MEDIUM

(71) Applicant: CANON KABUSHIKI KAISHA, Tokyo (JP)

(72) Inventor: Kyohei Takeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 17/820,066

(22) Filed: Aug. 16, 2022

(65) Prior Publication Data

US 2023/0084993 A1 Mar. 16, 2023

(30) Foreign Application Priority Data

Aug. 24, 2021 (JP) ................................. 2021-136105

(51) Int. Cl.
*H04L 9/40* (2022.01)

(52) U.S. Cl.
CPC ...... *H04L 63/0838* (2013.01); *H04L 63/0853* (2013.01); *H04L 2463/082* (2013.01)

(58) Field of Classification Search
CPC ........... H04L 2463/082; H04L 63/0838; H04L 63/0853; H04W 12/06
See application file for complete search history.

(56) References Cited

U.S. PATENT DOCUMENTS

| | | | | |
|---|---|---|---|---|
| 8,661,254 B1 * | 2/2014 | Sama | ...................... | H04L 63/18 713/168 |
| 8,699,050 B2 * | 4/2014 | Tomita | ............... | H04N 1/00957 358/1.14 |
| 8,902,454 B2 * | 12/2014 | Liu | ........................ | G06F 3/1204 358/1.9 |
| 9,299,018 B2 * | 3/2016 | Maki | ................... | G06K 15/4095 |
| 9,800,757 B2 * | 10/2017 | Fujimoto | ............ | H04N 1/32507 |
| 10,574,692 B2 * | 2/2020 | Drake | ................. | H04L 63/0853 |
| 10,756,900 B2 * | 8/2020 | Parikh | .................... | H04L 9/3297 |
| 10,812,473 B2 * | 10/2020 | Ramesh Kumar | .. | H04L 63/0807 |
| 10,976,973 B2 * | 4/2021 | Balasubramanian | ........................ | H04N 1/00477 |
| 11,023,793 B2 * | 6/2021 | Hirano | ............. | G06K 19/06037 |

(Continued)

FOREIGN PATENT DOCUMENTS

JP 2012051376 A 3/2012
JP 2018197919 A 12/2018

(Continued)

OTHER PUBLICATIONS

Non-patent literature translation of JP 2014/030902A from IP.com (Year: 2012).*

*Primary Examiner* — Sharon S Lynch
(74) *Attorney, Agent, or Firm* — Canon U.S.A., Inc. IP Division

(57) ABSTRACT

A mobile terminal that communicates with an image forming apparatus includes a generating unit configured to generate a one-time password based on secret information managed in association with the image forming apparatus, a transmission unit configured to transmit the one-time password generated by the generating unit and user information to the image forming apparatus, and a control unit configured to, upon successful completion of authentication processing based on the one-time password and the user information transmitted by the transmission unit, provide a service for operating the image forming apparatus.

14 Claims, 15 Drawing Sheets

(56) References Cited

U.S. PATENT DOCUMENTS

| | | | |
|---|---|---|---|
| 11,875,071 B2* | 1/2024 | Bindana | G06F 3/1253 |
| 2007/0066343 A1* | 3/2007 | Silverbrook | G06Q 10/10 |
| | | | 455/557 |
| 2007/0067825 A1* | 3/2007 | Lapstun | G06F 21/608 |
| | | | 726/2 |
| 2009/0094457 A1* | 4/2009 | Lapstun | B41J 13/103 |
| | | | 713/168 |
| 2009/0284785 A1* | 11/2009 | Bando | G06F 21/608 |
| | | | 358/1.15 |
| 2009/0293110 A1* | 11/2009 | Koga | G06K 7/1095 |
| | | | 709/217 |
| 2009/0310178 A1* | 12/2009 | Tomita | G06F 3/1263 |
| | | | 358/1.15 |
| 2011/0085196 A1* | 4/2011 | Liu | G06F 3/1204 |
| | | | 358/1.15 |
| 2012/0192259 A1* | 7/2012 | Yin | H04L 63/0853 |
| | | | 726/7 |
| 2013/0124855 A1* | 5/2013 | Varadarajan | G07F 19/20 |
| | | | 726/4 |
| 2013/0179692 A1* | 7/2013 | Tolba | H04L 63/0861 |
| | | | 713/179 |
| 2013/0276075 A1* | 10/2013 | Gong | H04W 12/08 |
| | | | 726/5 |
| 2014/0211240 A1* | 7/2014 | Maki | G06K 15/4095 |
| | | | 358/1.14 |
| 2017/0280008 A1* | 9/2017 | Fujimoto | H04N 1/00344 |
| 2017/0346851 A1* | 11/2017 | Drake | H04L 9/0838 |
| 2019/0147309 A1* | 5/2019 | Hirano | H04W 8/005 |
| | | | 726/5 |
| 2020/0404019 A1* | 12/2020 | Drake | H04L 9/3226 |
| 2021/0258308 A1* | 8/2021 | Avetisov | H04L 9/3215 |
| 2022/0197576 A1* | 6/2022 | Bindana | G06F 3/1238 |
| 2023/0179592 A1* | 6/2023 | Colesanto | H04L 63/107 |
| | | | 726/7 |

FOREIGN PATENT DOCUMENTS

| | | |
|---|---|---|
| JP | 2019155610 A | 9/2019 |
| JP | 2020166736 A | 10/2020 |
| JP | 2020531990 A | 11/2020 |
| JP | 2021072599 A | 5/2021 |

* cited by examiner

FIG.2
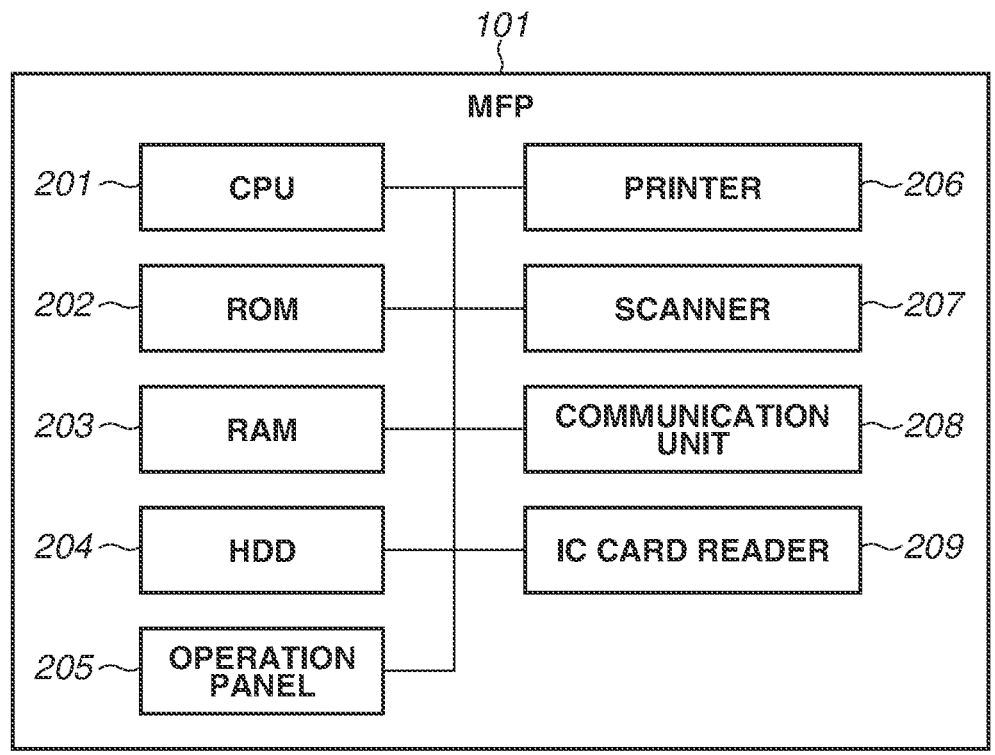
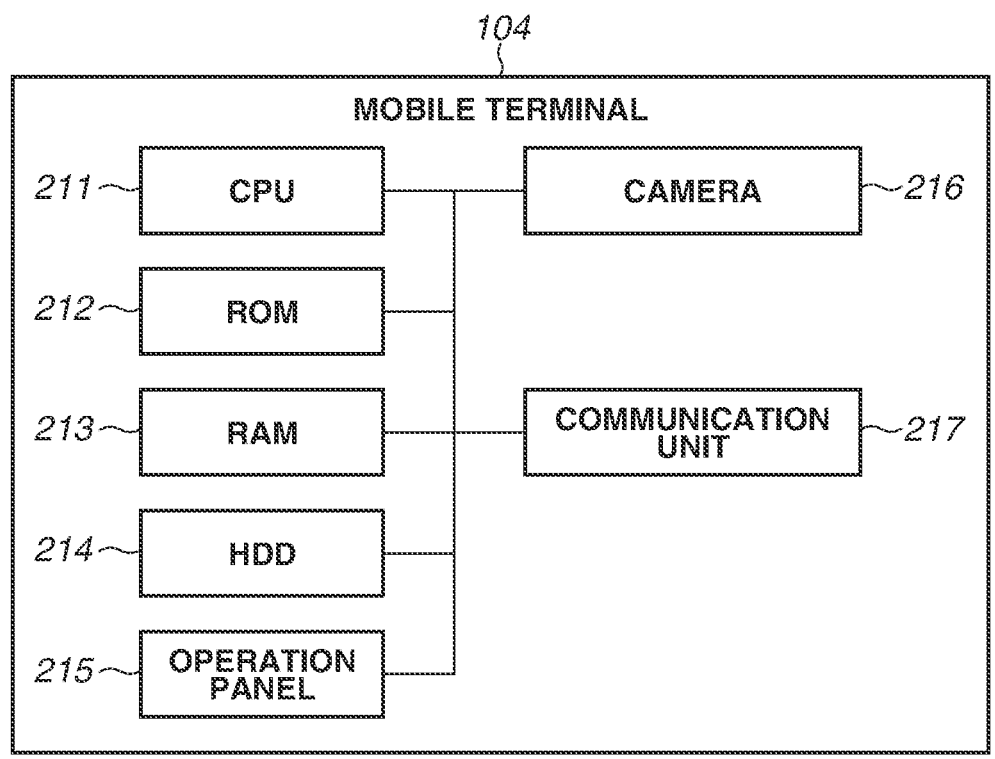

FIG.3
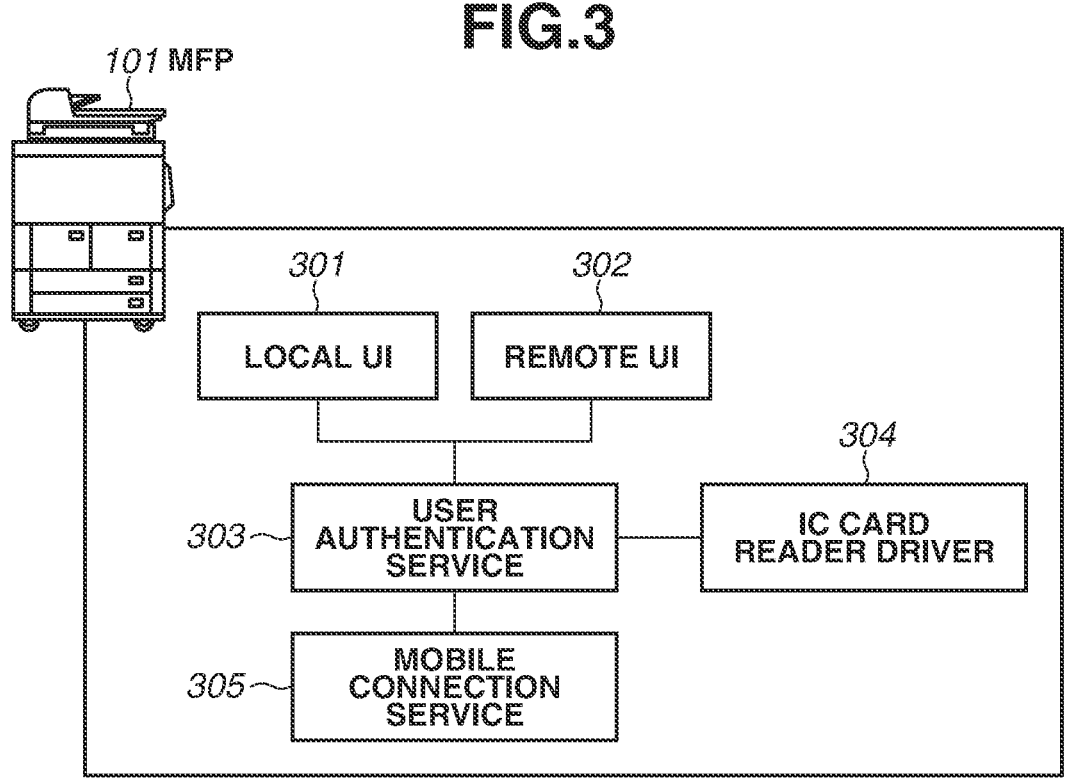
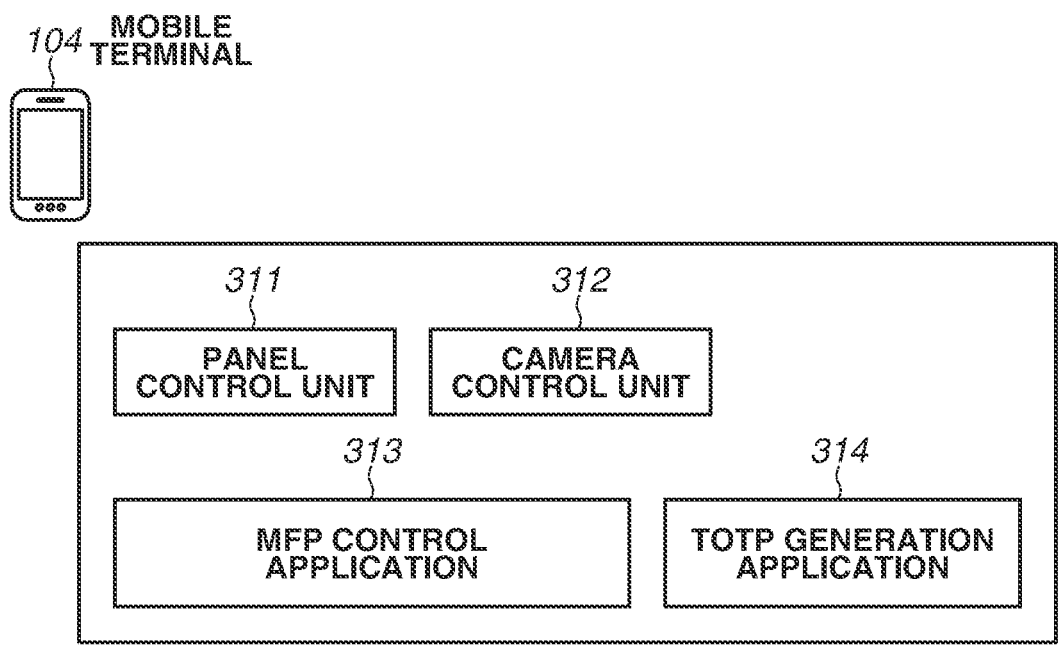

FIG.4

| MULTI-FACTOR AUTHENTICATION SETTING | ~401 |

ENABLE MULTI-FACTOR AUTHENTICATION
● ON
○ OFF

| PRINT SETTING | ~402 |

PERFORM FORCED RESERVATION
● ON
○ OFF

FIG.5

| | USER MANAGEMENT | | | |
|---|---|---|---|---|
| | REGISTER EDIT DELETE | | | |
| | | USER NAME | ROLE | E-MAIL |
| | ☐ | Admin | Administrator | admin@comon.com |
| | ☐ | Alice | Administrator | alice@comon.com |
| | ☐ | Bob | GeneralUser | bob@comon.com |
| | ☐ | Carol | GeneralUser | carol@comon.com |
| | ☐ | Dave | LimitedUser | dave@comon.com |

~501

USER EDITING

USER NAME: Alice

PASSWORD: ✱✱✱✱✱✱✱

IDENTIFICATION NUMBER: ✱✱✱✱✱

CARD ID: 44E7158E...

ROLE: Administrator ▼

E-MAIL ADDRESS: alice@comon.com

ONE-TIME PASSWORD: STATUS: ENABLED  [DISABLE] ~503

MY PROFILE EDITING — 601

USER NAME: Bob

PASSWORD: [ * * * * * * * ]

IDENTIFICATION NUMBER: [ * * * * * ]

CARD ID: 045BB438...

ROLE: GeneralUser

E-MAIL ADDRESS: [ bob@comon.com ]

ONE-TIME PASSWORD: STATUS: ENABLED

FIG.13
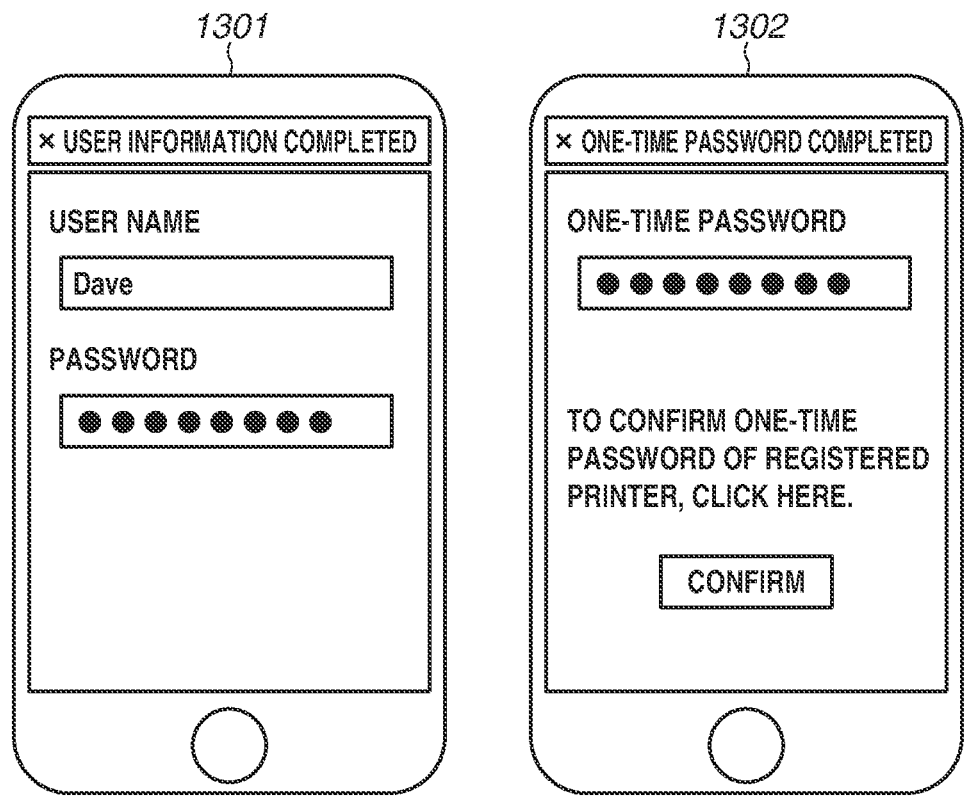
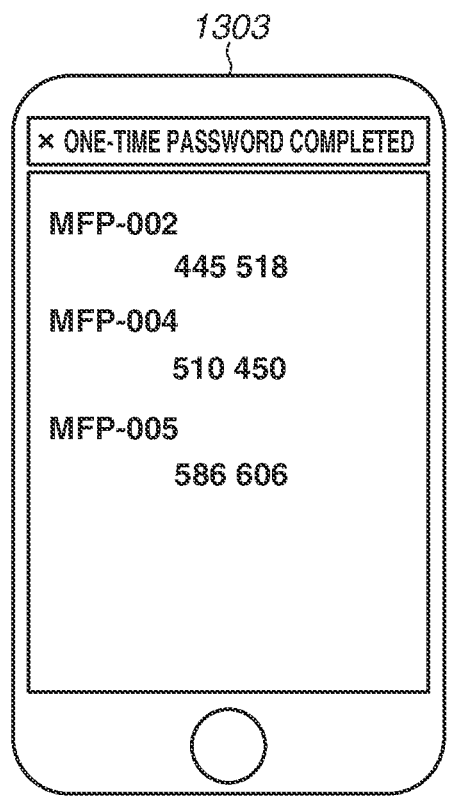

MOBILE TERMINAL, CONTROL METHOD, AND STORAGE MEDIUM

BACKGROUND

Field of the Disclosure

The present disclosure relates to a mobile terminal, a control method, and a storage medium.

Description of the Related Art

As cyber attacks have become increasingly sophisticated in recent years, the introduction of multi-factor authentication has been accelerated as countermeasures against such cyber attacks. There are three different factors of multi-factor authentication: "knowledge information", "possession information", and "biological information". The "knowledge information" refers to information that only the user knows. Examples of the knowledge information include a password and a personal identification number. The "possession information" refers to information that only the user possesses. Examples of the possession information include an Integrated Circuit (IC) card and a hardware token (one-time password). The "biological information" refers to unique biological information and features that the user has. Examples of the biological information include fingerprints, veins, and a face. The use of the multi-factor authentication, in which authentication is executed using two or more of the "knowledge information," "possession information", and "biological information" in combination, enables countering of cyber attacks and reduces the risk of unauthorized access to a system.

As a user authentication method for using the operation panel of an image forming apparatus installed in an office, there is provided a method for performing user authentication by using an IC card distributed as an employee identification (ID) card. This user authentication method is convenient for users because authentication is completed simply by holding up an IC card, so that the method has been widely used.

Meanwhile, some image forming apparatuses provide the multi-factor authentication method using a combination of an IC card as "possession information" and a personal identification number and password as "knowledge information". There are also image forming apparatuses that provide the multi-factor authentication method using a combination of an IC card as "possession information" and biometric authentication (refer to Japanese Patent Application Laid-Open No. 2019-155610).

Image forming apparatuses have a web server function that allows an access from a web browser of a personal computer (PC) terminal. This function enables the user to remotely access the image forming apparatus by using the web browser of the PC terminal and operate a user interface (UI) created in HyperText Markup Language (HTML). Hereinafter, an HTML-based UI is referred to as a remote UI. Generally, "knowledge information" such as an ID and a password is used as a method for authenticating the user who wants to use the remote UI of an image forming apparatus. Japanese Patent Application Laid-Open No. 2021-72599 discusses a configuration in which a user is requested to input authentication information (password) to use a remote UI of a communication apparatus such as a printer.

As an authentication method used to remotely access an image forming apparatus using a PC terminal, there is a method using a one-time password. In this method, a one-time password is calculated based on secret information generated for each user by the image forming apparatus and the current time. Generally, the secret information is stored in the user's PC terminal, and the PC terminal generates a one-time password using the secret information. The multi-factor authentication using a one-time password as "possession information" in addition to a user ID and a password as "knowledge information" is currently being employed as an authentication method in remote accessing.

However, in recent years, there has been an increasing number of services for operating an image forming apparatus by using a mobile terminal such as a smart phone, as well as a PC terminal. This has increased the necessity of employing the multi-factor authentication using a one-time token password as an authentication method to remotely access an image forming apparatus using a mobile terminal in like manner with the case of remote accessing an image forming apparatus using a PC terminal.

SUMMARY

Some embodiments of the present disclosure are directed to providing a multi-factor authentication method using a one-time token password to users who access an image forming apparatus using their mobile terminals, and providing an apparatus that provides security features against cyber attacks.

According to an embodiment of the present disclosure, a mobile terminal that communicates with an image forming apparatus includes a generating unit configured to generate a one-time password based on secret information managed in association with the image forming apparatus, a transmission unit configured to transmit the one-time password generated by the generating unit and user information to the image forming apparatus, and a control unit configured to, upon successful completion of authentication processing based on the one-time password and the user information transmitted by the transmission unit, provide a service for operating the image forming apparatus.

Further features of various embodiments will become apparent from the following description of exemplary embodiments with reference to the attached drawings.

BRIEF DESCRIPTION OF THE DRAWINGS

FIG. 2 illustrates hardware configurations of a Multifunction Peripheral (MFP) and a mobile terminal.

FIG. 3 illustrates software configurations of the MFP and the mobile terminal.

FIG. 4 illustrates user interfaces (UIs) for settings of the MFP.

FIG. 5 illustrates UIs for user management.

FIG. 6 illustrates a UI for editing "my profile".

FIG. 13 illustrates screens on the mobile terminal that are provided in executing printing on the MFP from the mobile terminal according to a second exemplary embodiment.

DESCRIPTION OF THE EMBODIMENTS

Exemplary embodiments for embodying the present disclosure will be described below with reference to the accompanying drawings.

A first exemplary embodiment of the present disclosure will be described below centering on a Multifunction Peripheral (MFP) having copy, print and scan functions, which is an example of an image forming apparatus to which the present disclosure is applied, and a mobile terminal, assuming that the MFP is installed in an office.

System Configuration

Figure 1:
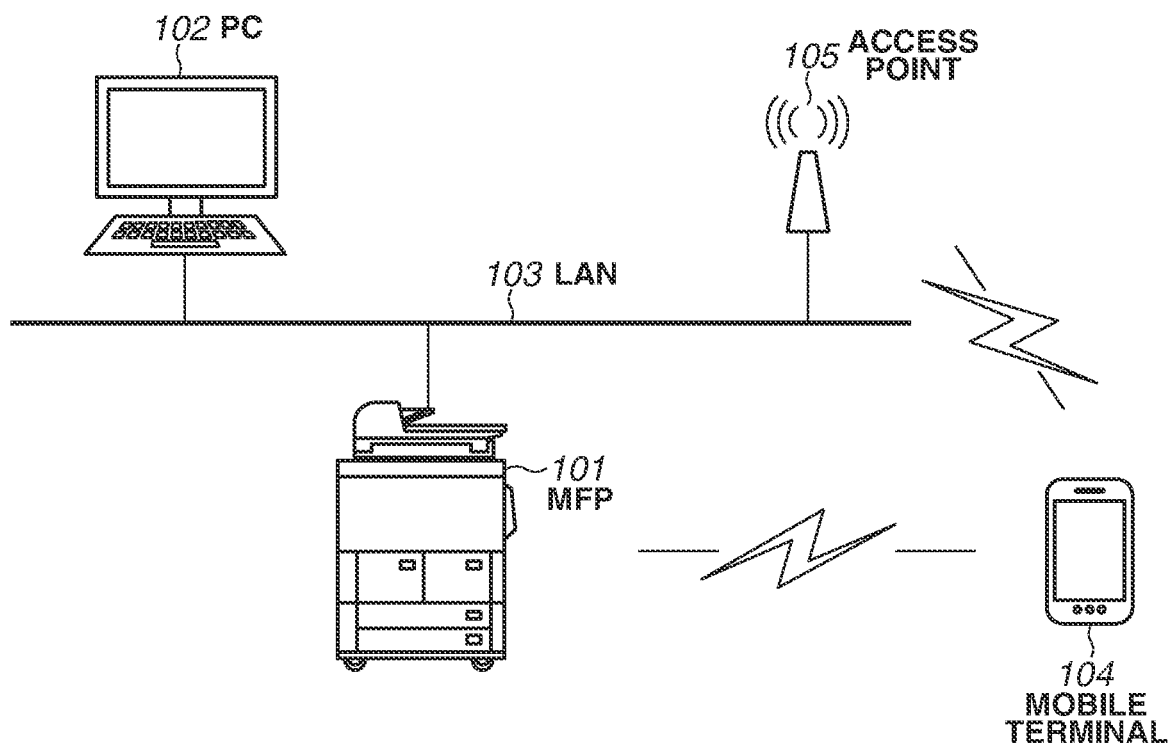
FIG. 1 illustrates a network configuration.

A network configuration in an office environment according to the first exemplary embodiment will be described below with reference to FIG. 1.

An MFP 101 is an image forming apparatus having at least a print function. The MFP 101 communicates with a personal computer (PC) terminal (e.g., a PC 102) connected through a local area network (LAN) 103.

The user accesses the MFP 101 from a web browser of the PC terminal to use the remote user interface (UI) of the MFP 101. The MFP 101 can receive a print job and a request for accessing a document stored in the MFP 101 from a terminal (e.g., the PC 102).

A mobile terminal 104 communicates with the MFP 101 via an access point 105 on the LAN 103. The mobile terminal 104 may be directly connected with the MFP 101 via a wireless LAN without interposing the access point 105 therebetween. By using the mobile terminal 104, the user can issue a print execution instruction, set destination information stored in the mobile terminal 104 in the MFP 101, and perform other diverse functions.

Hardware Configuration

FIG. 2 is a schematic view illustrating hardware configurations of the MFP 101 and the mobile terminal 104.

The CPU 201 is a central processing unit (processor) that controls the operation of the entire MFP 101. A Random Access Memory (RAM) 203 is a volatile memory serving as a work area and is also used as a temporary storage area for loading various control programs stored in a Read Only Memory (ROM) 202 and a Hard Disk Drive (HDD) 204.

The ROM 202 is a nonvolatile memory and stores the boot program of the MFP 101. The HDD 204 is a nonvolatile hard disk having a larger capacity than the RAM 203. The HDD 204 stores control programs of the MFP 101. The HDD 204 also stores an operating system (OS) and applications programs.

At the time of the activation of the MFP 101, the CPU 201 executes the boot program stored in the ROM 202. This boot program is for reading the program of the OS stored in the HDD 204 and loading the program into the RAM 203. After executing the boot program, the CPU 201 subsequently executes the program of the OS loaded in the RAM 203 to control the MFP 101. The CPU 201 also stores data to be used for the operations of control programs into the RAM 203, and reads and writes the data.

Although a description is given on the assumption that the MFP 101 executes each process in flowcharts described below, other configurations may be employed. For example, a plurality of CPUs or micro-processing units (MPUs) may cooperate with each other to execute each process illustrated in flowcharts described below. Alternatively, part of the processing described below may be executed by using a hardware circuit such as an application specific integrated circuit (ASIC) and a field programmable gate array (FPGA).

An operation panel 205 is a touch-operable display.

A printer 206 is a printer engine for printing print data received from an external device via a communication unit 208 and digital data acquired from a scanner 207.

The scanner 207 is a scanner apparatus that reads a paper document and generates digital data.

The communication unit 208 is a network interface for connecting with the Internet and a LAN in the office.

An integrated circuit (IC) card reader 209 is an apparatus for reading information to be used for user authentication from an IC card and is a unit necessary to implement IC card authentication.

Components of the mobile terminal 104 will be described below. A CPU 211, a ROM 212, a RAM 213, an HDD 214, and an operation panel 215 play almost similar roles to those in the above-described hardware configuration of the MFP 101, and redundant descriptions of these components will be thus omitted.

A camera 216 according to the present exemplary embodiment reads a two-dimensional code (e.g., Quick Response (QR) Code®). A communication unit 217 is a communication interface unit for performing wireless LAN communication with the access point 105 and the MFP 101.

Software Configuration

FIG. 3 is a schematic diagram illustrating software configurations of the MFP 101 and the mobile terminal 104. A local UI 301 of the MFP 101 provides a user interface (UI) for enabling a user who locally accesses the MFP 101 to change the settings of the MFP 101 and use functions of the MFP 101 via the display of the operation panel 205. A remote UI 302 incudes a HyperText Transfer Protocol (HTTP) server function. The remote UI 302 provides a user who locally accesses the MFP 101 with a UI written in HyperText Markup Language (HTML).

The user can access the remote UI 302 by using a web browser of the PC terminal to change the settings of the MFP 101 and use the functions of the MFP 101. The web browser of the PC terminal displays a UI written in HTML. The user changes the settings and uses the functions by operating the UI displayed on this web browser.

A user authentication service 303 is a software module that authenticates the user who desires to use the local UI 301 and the remote UI 302. The user authentication service 303 authenticates the user who desires to use the local UI 301 based on an IC card and a personal identification number. The user authentication service 303 also authenticates the user who desires to use the remote UI 302 and the user who desires to use the mobile terminal 104 based on their user names, passwords, and one-time passwords. An IC card reader driver 304 is a driver for controlling the IC card reader 209 and acquires information from an IC card and provides the user authentication service 303 with the IC card information.

A mobile connection service 305 is a software module for performing control to connect with the mobile terminal 104. The mobile connection service 305 converts information necessary to perform wireless LAN connection into a QR code, displays the QR code, and establish a wireless LAN connection in response to a connection request from the mobile terminal 104.

The software configuration of the mobile terminal 104 will be described below. A panel control unit 311 provides the user with a user interface for changing the settings of the mobile terminal 104 and using the functions of the mobile terminal 104, using the display of the operation panel 215. A camera control unit 312 reads the QR code displayed by the MFP 101, using the camera 216.

An MFP control application 313 is an application installed in the mobile terminal 104 to control the MFP 101. Not only the MFP 101 but also other MFPs can be registered. According to the present exemplary embodiment, the MFP control application 313 reads the QR code displayed by the MFP 101 to acquire wireless LAN parameters, and forms a wireless LAN connection between the mobile terminal 104 and the MFP 101. Instead of establishing a wireless LAN connection by reading the QR code, the mobile terminal 104 may be connected with the MFP 101 based on wireless LAN parameters directly input to the mobile terminal 104, or based on wireless LAN parameters given to the mobile terminal 104 via Bluetooth or Near Field Communication (NFC).

A time-based one-time password (TOTP) generation application 314 is an application installed in the mobile terminal 104 to generate a TOTP.

One-Time Password

A one-time password according to the present exemplary embodiment will be described below. The method for generating a one-time password conforms to the TOTP prescribed in Request For Comments 6238 (RFC6238). More specifically, the TOTP generation application 314 generates a one-time password (hereinafter also referred to as a TOTP one-time password) as authentication information based on TOTP secret information (hereinafter referred to as a secret or a TOTP secret) generated for each user and time information. The TOTP secret is a random number.

In recent years, mobile applications (smart phone applications) that support the TOTP have been widely used. Examples of such applications include Google Authenticator® from Google Corporation and Microsoft Authenticator® from Microsoft. By registering the character string of the TOTP secret in a mobile application that supports the TOTP or by capturing the image of a QR code including the TOTP secret information using the mobile terminal 104, the TOTP secret is stored in the mobile application. The TOTP secret is thus shared by an issuer of the TOTP secret and the mobile application. The present exemplary embodiment is described on the premise that the issuer of the TOTP secret is the MFP 101. When the mobile terminal 104 captures the image of the QR code displayed on the screen of the MFP 101, the mobile application acquires the TOTP secret.

The mobile application supporting the TOTP generates a one-time password based on the TOTP secret and the time information. In addition to mobile applications that support the TOTP, plug-ins also support the TOTP and are installable as extended functions of the web browser of the PC. According to the exemplary embodiment, the issuer of the TOTP secret is the user authentication service 303 of the MFP 101. Also the TOTP secret can be generated by the mobile application when the user accessing the MFP 101 registers information about the MFP 101 in the mobile terminal 104 by using the TOTP generation application 314 and the MFP control application 313 installed in the mobile terminal 104 that the user owns. Generally, a one-time password generated by using software, such as a mobile application or a web browser's plug-in, is referred to as a software token.

An authentication method using a software token is referred to as software token authentication.

According to the present exemplary embodiment, upon reception of a request from the local UI 301, the remote UI, or the mobile terminal 104, the user authentication service 303 generate a TOTP secret, generates a one-time password, and collates the one-time password.

According to the present exemplary embodiment, a user information table (described below) indicates the enabled and the disabled states of the one-time password. The enabled state of the one-time password is a state where the TOTP secret is recorded in association with account information for the user. The disabled state of the one-time password is a state where the TOTP secret is not recorded in association therewith.

User Information

User information managed by the user authentication service 303 will be described below. The user authentication service 303 manages the user information stored in a user information table as illustrated in Table 1. The user information table is a database recorded in the HDD 204. Databases of other nodes on the network may be used after completion of the encryption of the communication path and storage and the prevention of alteration. The user information table records the card ID, personal identification number, password, TOTP secret, user role, and user e-mail address to be used for the IC card authentication.

TABLE 1

| User name | Card ID | Identification No. | Password | TOTP secret | Role | E-mail |
|---|---|---|---|---|---|---|
| Admin | F1EABB15 . . . | 479960 | ******** | 6fc11e17-faf4 . . . | Administrator | admin@comon.com |
| Alice | 44E7158E . . . | 922524 | ******** | 96df7500-7e82 . . . | Administrator | alice@comon.com |
| Bob | 045BB438 . . . | 033886 | ******** | | GeneralUser | bob@comon.com |
| Carol | 19E313B6 . . . | 838214 | ******** | 1fb233f6-1f8e . . . | GeneralUser | carol@comon.com |
| Dave | BDFDB35 . . . | 375384 | ******** | | LimitedUser | dave@comon.com |

The TOTP secret is uniquely determined for the user information (such as the user name).

The role is information indicating the user's authority to use the MFP 101. A role information table (Table 2) below indicates each role and authority thereof as an example. In addition to the definitions of roles set at the time of factory shipment of the MFP 101, the user may create a new role by setting a detailed authority for the role. The "setting change" in Table 2 refers to an operation of changing the setting values of the MFP 101, such as user authentication settings and user management described below. Various types of settings, such as network settings and print function settings of the MFP 101, may be also changed. "Administrator" is a role given to an administrator user, and "GeneralUser" and "LimitedUser" are roles given to a general user.

TABLE 2

| Role | Authority |
| --- | --- |
| Administrator | Setting change permitted, color printing permitted, address book editing permitted |
| GeneralUser | Setting change inhibited, color printing permitted, address book editing permitted |
| LimitedUser | Setting change inhibited, color printing inhibited, address book editing inhibited |

User Authentication Setting

The user authentication settings included in the MFP 101 will be described below.

FIG. 4 illustrates examples of UIs for the user authentication settings of the MFP 101 provided by the remote UI 302. Not only the remote UI 302 but also the local UI 301 may provide similar UIs for administrator users.

A UI 401 relates to the multi-factor authentication setting. When the setting 401 is set to ON in the local UI 301, the multi-factor authentication that combines authentication of an IC card as "possession information" and authentication of a personal identification number as "knowledge information" is enabled. On the other hand, the authentication using a one-time password generated as "possession information" based on a hardware or software token is applied to the remote UI 302. When the multi-factor authentication is enabled in the UI 401, the user is requested for the multi-factor authentication at the time of accessing from the mobile terminal 104.

The multi-factor authentication using a one-time password is also applicable to the local UI 301. In addition, the multi-factor authentication may be separately set to the local UI 301 and the remote UI.

A UI 402 is used to enable or disable forced reservation. When the forced reservation is ON, upon receiving a print job, the image forming apparatus (MFP) 101 temporarily reserves the received print job without immediately executing printing. The user is requested to perform user authentication to proceed to printing, and, if the authentication is successfully completed, printing becomes executable.

User Management

FIG. 5 illustrates examples of UIs for management of user accounts of the MFP 101 that are provided by the remote UI 302. Not only the remote UI 302 but also the local UI 301 may provide similar UIs for administrator users.

A user management screen 501 is provided to manage a list of user accounts. This screen can be accessed only by an administrator having the role of Administrator. The user management screen 501 provides the user with functions of registering a new user count, selecting a registered account, and editing and deleting the selected account. For example, when the user "Admin" selects the account of "Alice" and then presses the edit button in the user management screen 501, the PC 102 displays a user editing screen 502. The user editing screen 502 enables the user to edit and store the password, the personal identification number, the card ID, the e-mail address, and the role. The user editing screen 502 displays the (enabled/disabled) status of the one-time password to be used for the user authentication of the remote UI. The administrator can initialize (disable) the one-time password by pressing a "disable" button 503 in the user editing screen 502.

My Profile Editing

FIG. 6 illustrates an example of a UI for editing "my profile" provided by the remote UI 302.

A my profile editing screen 601 is a UI used when the user who has logged in to the remote UI 302 confirms and edits the user's own account information. This UI is provided to all users who are allowed to log in to the remote UI 302. Not only the remote UI 302 but also the local UI 301 may provide a similar UI. The my profile editing screen 601 enables editing and storing of the password, the personal identification number, and the e-mail address. However, the user cannot change his or her own role. Only the administrator user can edit the role. The my profile editing screen 601 enables confirmation of the (enabled/disabled) status of the one-time password to be used for the user authentication of the remote UI 302.

Login Operation

Next, an operation performed when the user logs in to the MFP 101 will be described below with reference to a flowchart illustrated in FIG. 7. According to the present exemplary embodiment, procedures illustrated in the flowchart are recorded in the software programs of the local UI 301, the remote UI 302, the user authentication service 303, and the IC card reader driver 304. The software programs are stored in a nonvolatile storage such as the ROM 202 and the HDD 204, and when the software programs are loaded to the RAM 203 and executed by the CPU 201, the flow of processing illustrated in the flowchart is executed. The pieces of software, such as the local UI 301, the remote UI 302, the user authentication service 303, and the IC card reader driver 304, mutually provide application programming interfaces (APIs) and operate in a collaborative way by mutually using the APIs. In the description of the operation flow, descriptions of API calls will be omitted.

Remote UI Login Operation Flow

The operation flow performed when the user logs in to the remote UI 302 will be described below with reference to FIGS. 7 and 8.

Figure 7:
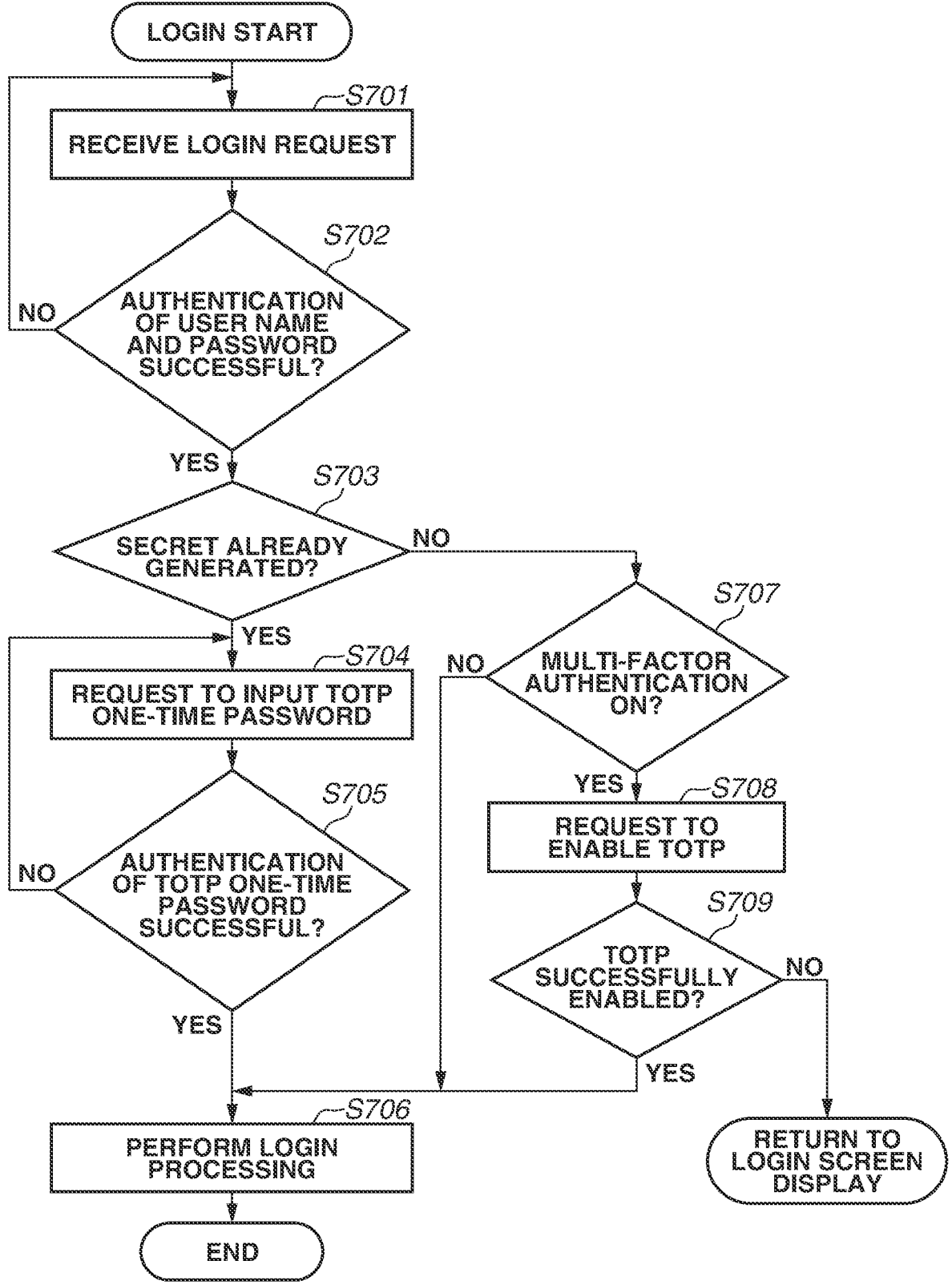
FIG. 7 is a flowchart illustrating a flow of operation performed at the time of user authentication via a remote UI.
Figure 8:
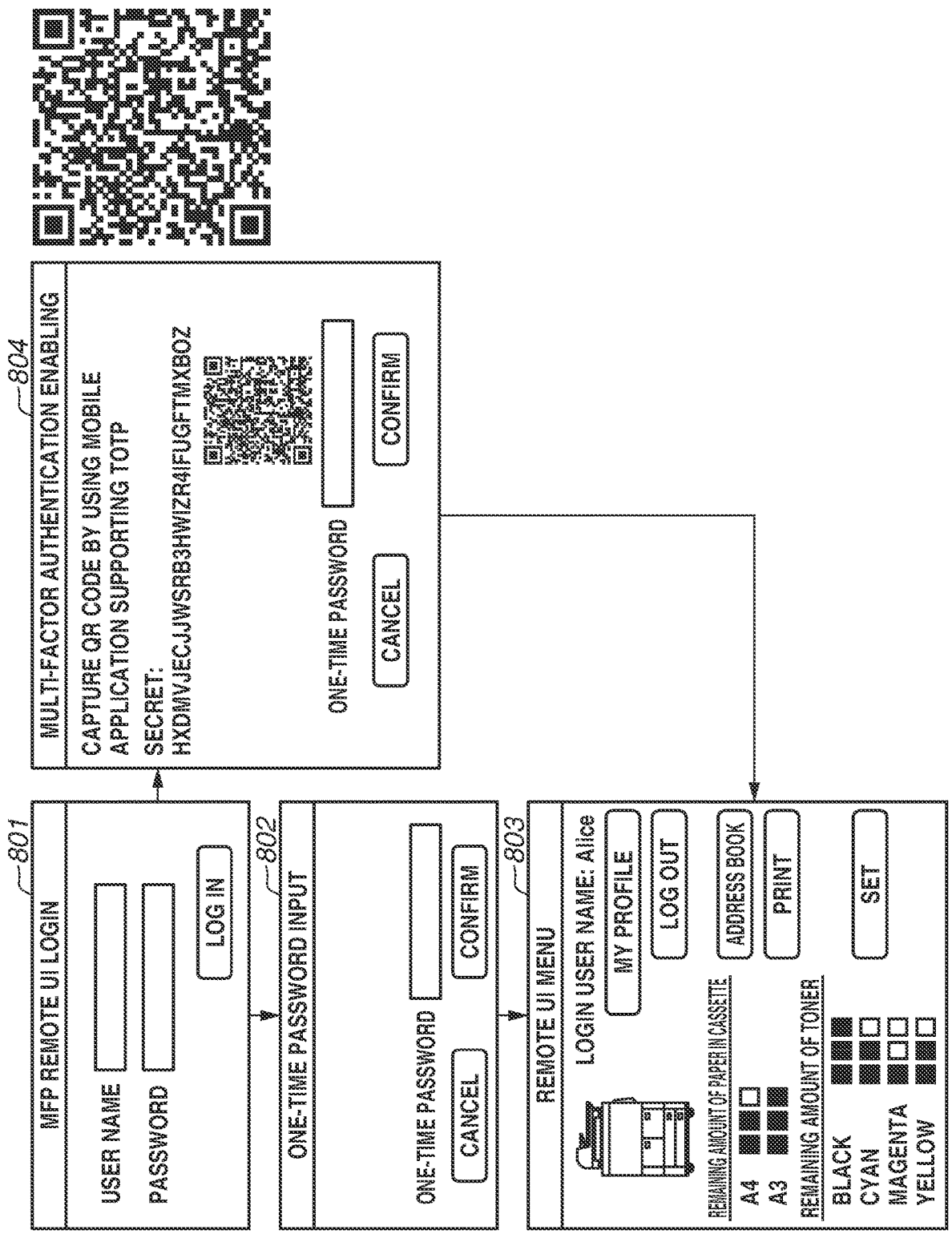
FIG. 8 illustrates screens provided to a web browser of a personal computer (PC) by the remote UI, and screen transition.

FIG. 7 is a flowchart illustrating the operation performed at the time of the user authentication via the remote UT 302. FIG. 8 illustrates HTML-based screens to be provided to the web browser of the PC 102 by the remote UI, and transition of the screens.

When the remote UI 302 detects an access to the remote UI 302, the remote UI 302 displays a remote UI login screen 801. In step S701, when the user inputs a user name and a password and then presses a login button in the remote UI, the remote UI 302 detects a login operation. In step S702, the user authentication service 303 checks the input user name and password with reference to the user information table (Table 1) to perform the user authentication. In a case where the authentication processing fails (NO in step S702), the user authentication service 303 displays an authentication error and then instructs the remote UI 302 to display the remote UI login screen 801 to prompt the user to input the user name and the password again. In a case where the checking of the user name and the password is successful (YES in step S702), the user authentication service 303 identifies the account that has succeeded in the checking.

In step S703, the MFP 101 determines whether the TOTP secret has already been registered with reference to the TOTP secret in the user information table (Table 1) that corresponds to the identified account. In a case where the TOTP secret has already been registered (YES in step S703), then in step S704, the MFP 101 determines that the one-time password is enabled, and displays a one-time password input screen 802 on the remote UI of the PC 102 to prompt the user to input the one-time password.

In step S705, the MFP 101 acquires the input one-time password from the PC 102, and the user authentication service 303 checks the input one-time password with reference to the one-time password calculated based on the time information and the TOTP secret to authenticate the one-time password. In a case where the input one-time password is correct (YES in step S705), then in step S706, the MFP 101 performs processing for allowing the user to log into the MFP 101.

On the other hand, in a case where the checking of the one-time password fails (NO in step S705), the MFP 101 displays a message on the PC 102 to notify the user that the one-time password is mismatched and displays the one-time password input screen 802 again to prompt the user to input the one-time password again. If the user makes input errors the predetermined number of times or more, the MFP 101 determines that it is currently being attacked and locks out the account for a predetermined period of time.

In step S706, the MFP 101 gives the user being subjected to the login processing the role of the user and the authority related to the role with reference to the user information table (Table 1) and the role information table (Table 2), and then controls the user's login to the MFP 101. The PC 102 displays a remote UI menu screen 803 for enabling the user to use the functions of the MFP 101 which is provided by the remote UI 302, and terminates the login operation. The PC 102 performs control to gray out the functions that the user does not have authority to use to prevent the user from selecting any of the unpermitted functions in the remote UI menu screen 803. In a case where the MFP 101 determines that the TOTP secret has not been registered and the one-time password is not enabled (NO in step S703), then in step S707, the MFP 101 determines whether the multi-factor authentication setting 401 is ON. The determination in step S707 may be performed before the determination in step S703. In this case, when the multi-factor authentication of the remote access is OFF (NO in step S707), the processing proceeds to step S706 without determining whether the TOTP secret has been generated, and the MFP 101 performs the login processing in step S706.

In a case where the MFP 101 determines that the multi-factor authentication is OFF (NO in step S707), then in step S706, the MFP 101 performs processing for enabling the user to log in to the MFP 101 without requesting the user to input the one-time password. On the other hand, in a case where the MFP 101 determines that the multi-factor authentication is ON (YES in step S707), then in step S708, the remote UI 302 generates a QR code including the TOTP secret via the user authentication service 303 and displays on the PC 102 a one-time password enabling screen 804. In step S709, the MFP 101 determines whether the TOTP is successfully enabled. In a case where the one-time password is normally enabled (YES in step S709), then in step S706, the MFP 101 performs processing for enabling the user to log in to the MFP 101. On the other hand, in a case where the TOTP is not normally enabled (NO in step S709), the MFP 101 changes the display screen of the PC 102 back to the remote UI login screen 801.

Connection Operation Between Mobile Terminal 104 and MFP 101

Figure 9A:
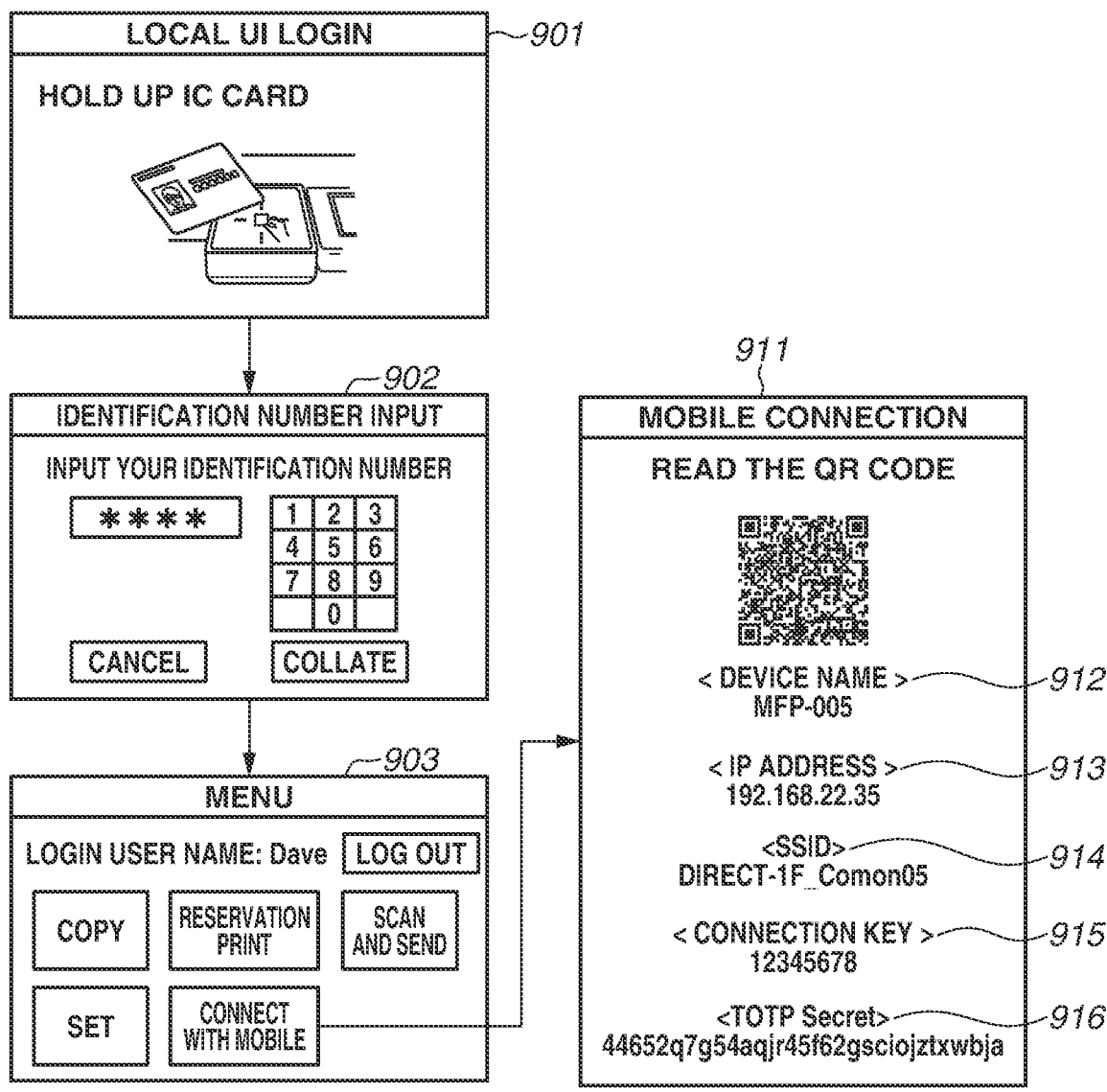
FIGS. 9A and 9B illustrate screens provided when a mobile terminal establishes a connection via a local UI, and screen transition.
Figure 9B:
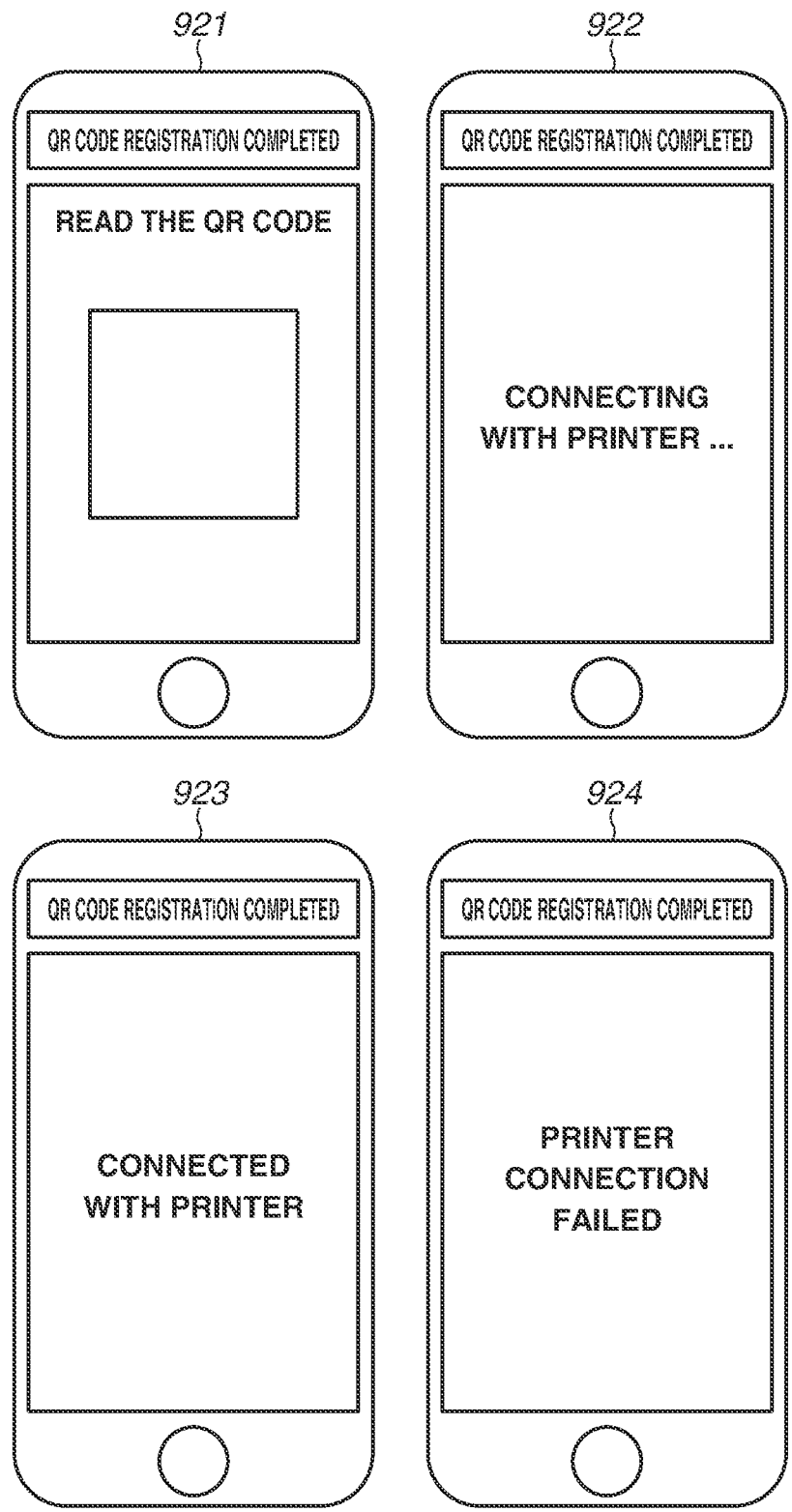

An operation performed when the user connects the user's mobile terminal 104 to the MFP 101 by using the MFP control application 313 of the mobile terminal 104 will be described below with reference to FIGS. 9A and 9B and the flowchart in FIG. 10.

The present exemplary embodiment will be described below on the premise that the multi-factor authentication setting 401 is ON. Furthermore, the description will be also given using an example of the user "Dave" illustrated in the user information table (Table 1). For the user "Dave", the card ID and the personal identification number for the IC card authentication of the local UI have already been registered, and the TOTP secret has not been registered. The MFP control application 313 of the mobile terminal 104 manages user information about only one owner of the mobile terminal 104 as illustrated in mobile terminal user information (Table 3).

TABLE 3

| User name | Password |
| --- | --- |
| Dave | ******** |

A local UI login screen 901 represents an IC card authentication screen of the local UI 301. A personal identification number input screen 902 is displayed when the IC card authentication processing is successful. When the personal identification number authentication processing is successful, a main menu 903 is displayed. When the user presses a "connect with mobile" button in the main menu 903, then in step S1011, the MFP 101 receives a request for displaying a mobile connection screen. Upon reception of the display request, the mobile connection service 305 of the MFP 101 transmits a request for generating a TOTP secret to the user authentication service 303. In step S1012, the user authentication service 303 accesses the user information table (Table 1) to check whether a TOTP secret of the login user ("Dave" in this case) has already been generated. In a case where a TOTP secret has already been generated (YES in step S1012), the processing proceeds to step S1014. On the other hand, a TOTP secret has not been generated (NO in step S1012), then in step S1013, the user authentication service 303 generates a TOTP secret and then transfers the generated TOTP secret to the mobile connection service 305. In step S1014, the mobile connection service 305 converts the TOTP secret 916 into a QR code together with a device name 912, parameters necessary for the wireless LAN connection, an Internet Protocol (TP) address 913, a service set identifier (SSID) 914, and a connection key 915, and displays the QR code on a mobile connection screen 911.

Figure 10:
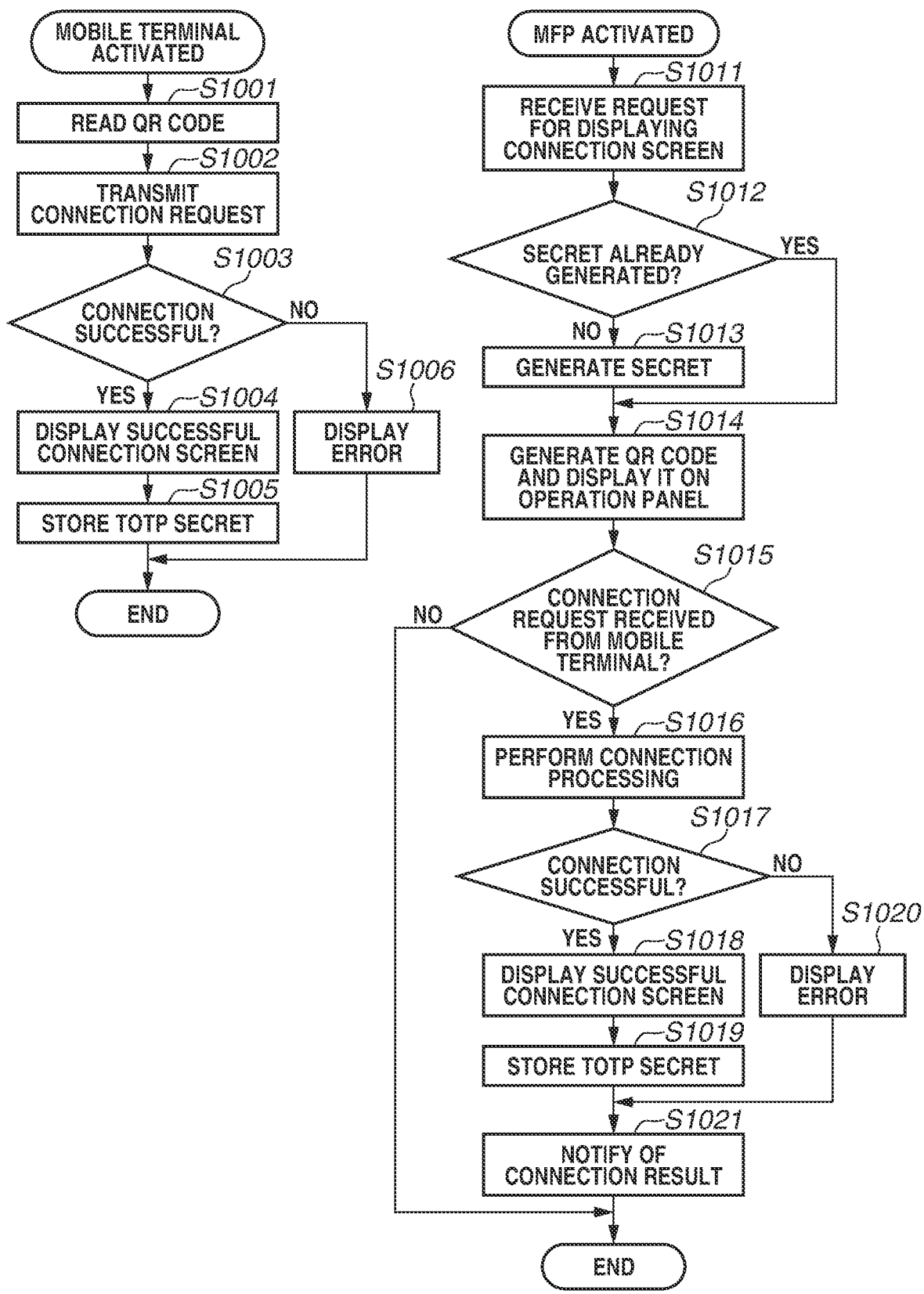
FIG. 10 is a flowchart illustrating a flow of operation when the mobile terminal establishes a connection with the MFP.

Although not illustrated in FIG. 10, in a case where it is determined that the TOTP secret has already been generated in step S1012 (YES in step S1012), a TOTP secret is not generated and the TOTP secret already registered in the user information table (Table 1) is displayed on the TOTP secret 916 (MFP 101). This means that the TOTP secret to be used to access the remote UI is identical to the TOTP secret to be used to access from the mobile terminal 104.

The same TOTP secret is used here in consideration of convenience. The TOTP secret for the remote UI 302 and the TOTP secret for the mobile terminal 104 may be managed in the user information table (Table 1) to employ a more secure configuration. In step S1012, a TOTP secret may be generated each time regardless of whether a TOTP secret has already been generated, and may overwrite the TOTP secret generated in the past.

In step S1001, the MFP control application 313 of the mobile terminal 104 reads the QR code displayed on the mobile connection screen 911 from a QR code registration screen 921. After the MFP control application 313 reads the QR code, then in step S1002, the MFP control application 313 transmits a connection request to the MFP 101 based on the parameters acquired from the QR code, and changes the display screen to a "connecting with printer" screen 922.

In a case where the user authentication service 303 of the MFP 101 receives the connection request from the mobile terminal 104 (YES in step S1015), then in step S1016, the user authentication service 303 starts connection processing. In a case where the connection request is received (NO in step S1015), the mobile connection screen 911 keeps being displayed until a connection request is received but may be switched to another screen after a lapse of a predetermined period of time.

In a case where the connection processing is successful (YES in step S1017), then in step S1018, the MFP 101 displays a successful connection screen (not illustrated). On the other hand, in a case where the connection processing has failed (NO in step S1017), then in step S1020, the MFP 101 displays an error screen (not illustrated). In step S1019, the MFP 101 registers the TOTP secret in the user information table (Table 1) for the login user "Dave". In step S1021, the MFP 101 notifies the mobile terminal 104 of the successful connection. In a case where the connection processing has failed in step S1017, the MFP 101 notifies the user of the connection failure in step S1021.

After the TOTP secret has been registered in step S1019, the TOTP secret of the user "Dave" is stored in a user information table (Table 4) as illustrated below.

and the mobile terminal 104 manages the information about the MFP 101 and the TOTP secret in an associated way.

Printing in MFP by Using Mobile Terminal

Figure 11:
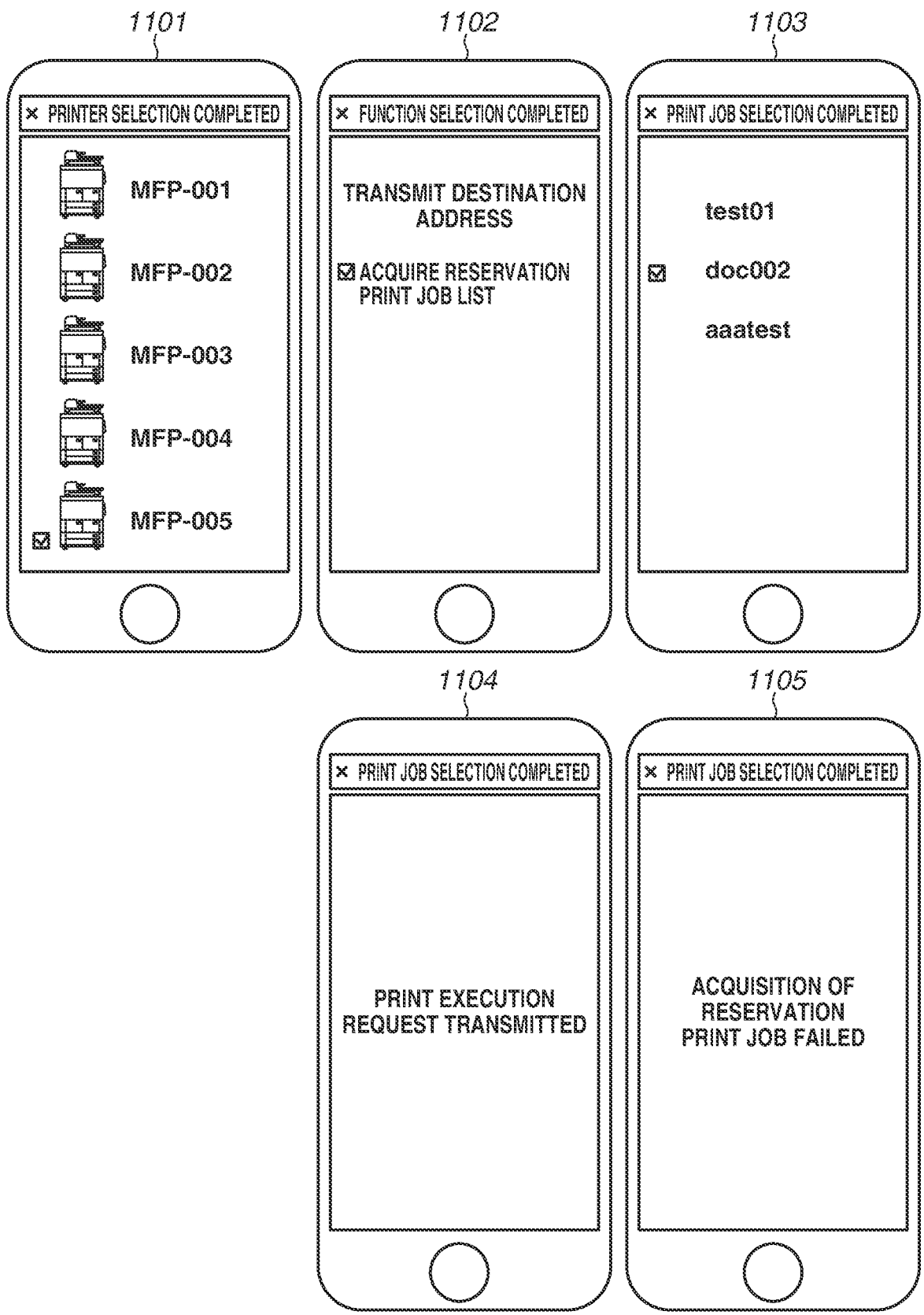
FIG. 11 illustrates screens on the mobile terminal that are provided in executing printing on the MFP from the mobile terminal.
Figure 12:
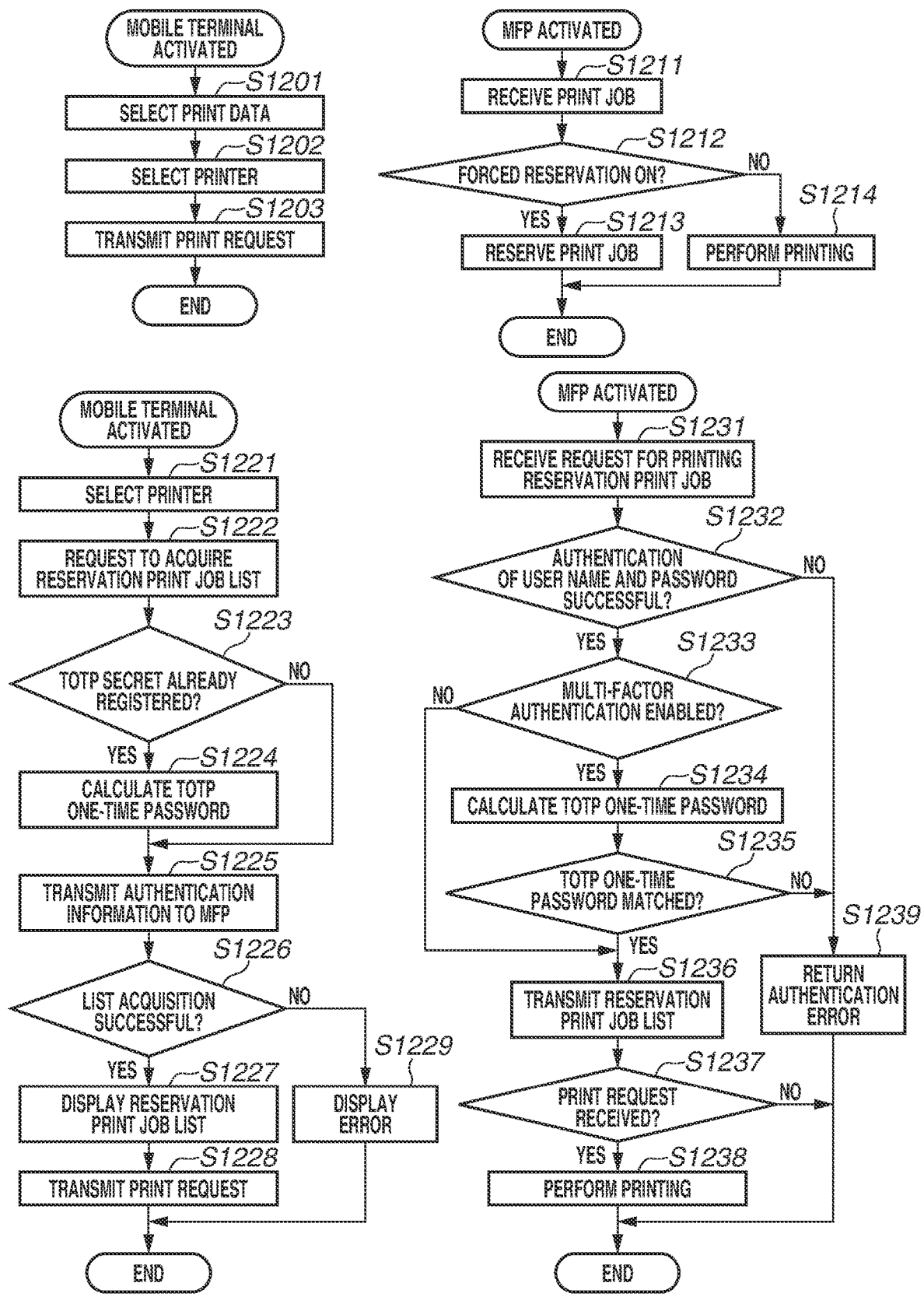
FIG. 12 is a flowchart illustrating a flow of operation performed in executing printing on the MFP from the mobile terminal.

An operation performed when the user performs printing on the MFP 101 by using the MFP control application 313 of the mobile terminal 104 will be described below with reference to FIG. 11 and the flowchart in FIG. 12.

The forced reservation is set to ON in the MFP 101 as illustrated in the UI 402. When the MFP 101 receives a print job with the forced reservation set to ON, the MFP 101 does not execute the print job immediately but reserves the print job temporarily. The user authentication is required to execute the reserved print job.

The screen used for performing printing from the mobile terminal 104 is not illustrated here. In step S1201, the user selects print data. In step S1202, the user selects a printer. In step S1203, the MFP control application 313 transmits a print request to the MFP 101. The processes in steps S1201 and S1202 may be performed in switched order.

In step S1211, the MFP 101 receives the print request from the mobile terminal 104. In step S1212, the MFP 101

TABLE 4

| User name | Card ID | Identification No. | Password | TOTP secret | Role | E-mail |
|---|---|---|---|---|---|---|
| Admin | F1EABB15 . . . | 479960 | ******** | 6fc11e17-faf4 . . . | Administrator | admin@comon.com |
| Alice | 44E7158E . . . | 922524 | ******** | 96df7500-7e82 . . . | Administrator | alice@comon.com |
| Bob | 045BB438 . . . | 033886 | ******** | | GeneralUser | bob@comon.com |
| Carol | 19E313B6 . . . | 838214 | ******** | 1fb233f6-1f8e . . . | GeneralUser | carol@comon.com |
| Dave | BDFDB35 . . . | 375384 | ******** | 44652q7g-54aq . . . | LimitedUser | dave@comon.com |

In a case where the MFP control application 313 of the mobile terminal 104 receives a notification of successful connection from the MFP 101 (YES in step S1003), then in step S1004, the MFP control application 313 displays a successful connection screen 923. On the other hand, in a case where the MFP control application 313 receives a notification of connection failure from the MFP 101 (NO in step S1003), then in step S1006, the MFP control application 313 displays a connection failure screen 924. In step S1005, the MFP control application 313 stores the TOTP secret in a device information list (Table 5). The device information list (Table 5) enables a plurality of devices to be registered. For devices for which the multi-factor authentication is not enabled, a TOTP secret is not registered.

In the present exemplary embodiment, the device name of the MFP 101 is "MFP-005", and the TOTP secret thereof is "44652q7g-54aq . . . ". Referring to Table 4, it can be confirmed that this TOTP secret coincides with the TOTP secret "44652q7g-54aq . . . " of user "Dave".

TABLE 5

| Device name | IP address | SSID | Connection key | TOTP secret |
|---|---|---|---|---|
| MFP-001 | 192.168.22.1 | DIRECT-1F_Comon01 | ******** | |
| MFP-002 | 192.168.22.10 | DIRECT-1F_Comon02 | ******** | 96df7500-7e82 . . . |
| MFP-003 | 192.168.22.21 | DIRECT-1F_Comon03 | ******** | |
| MFP-004 | 192.168.22.33 | DIRECT-1F_Comon04 | ******** | 1fb233f6-1f8e . . . |
| MFP-005 | 192.168.22.35 | DIRECT-1F_Comon05 | ******** | 44652q7g-54aq . . . |

As illustrated in Tables 4 and 5, the MFP 101 manages the user information and the TOTP secret in an associated way, confirms whether the forced reservation (Performed Forced Reservation) is set to ON. In a case where the forced reservation (Perform Forced Reservation) is set to OFF (NO in step S1212), then in step S1214, the MFP 101 performs printing. Then, the processing is ended. On the other hand, in a case where the forced reservation (Perform Forced Reservation) is set to ON (YES in step S1212), then in step S1213, the MFP 101 reserves the print job.

Procedures performed when the mobile terminal 104 issues an instruction to execute the print job reserved in step S1213 to the MFP 101 will be described below.

In step S1221, the user selects a printer by performing a user operation on a printer selection screen 1101. In step S1222, the user selects a function of acquiring a reservation print job list on a function selection screen 1102. When the processing in step S1222 is performed, then in step S1231, a request for acquiring a reservation print job list is transmitted to the MFP 101 selected in step S1221.

In step S1223, the MFP control application 313 confirms whether the TOTP secret of the MFP 101 designated by the user operation on the printer selection screen 1101 has already been registered with reference to the device information list (Table 5). In a case where a TOTP secret has already been registered (YES in step S1223), then in step S1224, the mobile terminal 104 calculates a TOTP one-time password based on the TOTP secret of the MFP 101 and the time information (current time) of the mobile terminal 104. The method of generating a one-time password conforms to the TOTP generation algorithm prescribed in RFC6238, as described above. In step S1225, the mobile terminal 104 transmits the calculated TOTP one-time password and the user name and the password in the mobile terminal user information (Table 3) to the MFP 101 as authentication information.

In a case where a TOTP secret has not been registered (NO in step S1223), the mobile terminal 104 does not calculate a TOTP one-time password but transmits only the user name and the password in the mobile terminal user information (Table 3) to the MFP 101 as the authentication information.

After the user authentication service 303 of the MFP 101 receives the request for acquiring a reservation print job list in step S1231, then in step S1232, the user authentication service 303 performs the authentication processing based on the user name and the password with reference to the user information table (Table 4). In a case where an error occurs in the authentication processing (NO in step S1232), then in step S1239, the MFP 101 returns information about the authentication error to the mobile terminal 104. Then, the processing is ended. On the other hand, in a case where the authentication process is successful (YES in step S1232), then in step S1233, the MFP 101 confirms whether the multi-factor authentication is enabled in the UI 401. In a case where the multi-factor authentication is enabled (YES in step 1233), then in step S1234, the MFP 101 calculates a TOTP one-time password based on the TOTP secret in the user information table (Table 4) and the time information (current time) of the MFP 101. The method for calculating the one-time password conforms to the TOTP generation algorithm prescribed in RFC6238, as described above. In step S1235, the MFP 101 confirms whether the TOTP one-time password calculated by the MFP 101 coincides with the TOTP one-time password received from the mobile terminal 104. In a case where the two TOTP one-time passwords match each other (YES in step S1235), then in step S1236, the MFP 101 transmits a reservation print job list of the user to the mobile terminal 104. The reservation print job list of the user is job list information managed by the MFP 101 in association with at least the user ID. On the other hand, in a case where the two TOTP one-time passwords do not match each other (NO in step S1235), then in step S1239, the MFP 101 returns information about an authentication error to the mobile terminal 104. Then, the processing in the flowchart is ended. In a case where the TOTP one-time password is not transmitted from the mobile terminal 104 regardless of the fact that the multi-factor authentication is enabled (YES in step S1233), the MFP 101 also determines that the TOTP one-time passwords do not match each other ("NO" in step S1235). Then, in step S1239, the MFP 101 transmits information about the authentication error to the mobile terminal 104.

In step S1226, the MFP control application 313 of the mobile terminal 104 confirms the result of acquisition of a reservation print job list. In a case where the acquisition of a reservation print job list is successful (YES in step S1226), then in step S1227, the mobile terminal 104 displays the acquired list in a print job selection screen 1103. On the other hand, in a case where the acquisition of a reservation print list has failed (NO in step S1226), then in step S1229, the mobile terminal 104 displays an error message 1105.

When the user selects a job to be printed in the print job selection screen 1103, then in step S1228, the mobile terminal 104 transmits a print execution request to the MFP 101, and a message notifying that a print execution request is transmitted is displayed on the mobile terminal 104. In a case where the MFP 101 receives the print execution request (YES in step S1237), then in step S1238, the MFP 101 performs printing. Then, the processing in this flowchart is ended. When the MFP 101 starts print processing, a message notifying that print processing is currently being executed may be displayed on the local UI 301 of the MFP 101 (not illustrated). In this way, by performing the authentication based on the user information or based on the user information and the one-time password, the mobile terminal 104 can issue a print execution instruction to the MFP 101 and also use services provided by the MFP 101.

As described above, by employing the one-time password authentication method, the MFP 101 and the mobile terminal 104 according to the present exemplary embodiment can apply the multi-factor authentication to the user who desires to access the image forming apparatus (MFP) 101 from the mobile terminal 104, and present exemplary embodiment therefore can provide an apparatus having security features against cyber attacks.

Figure 14:
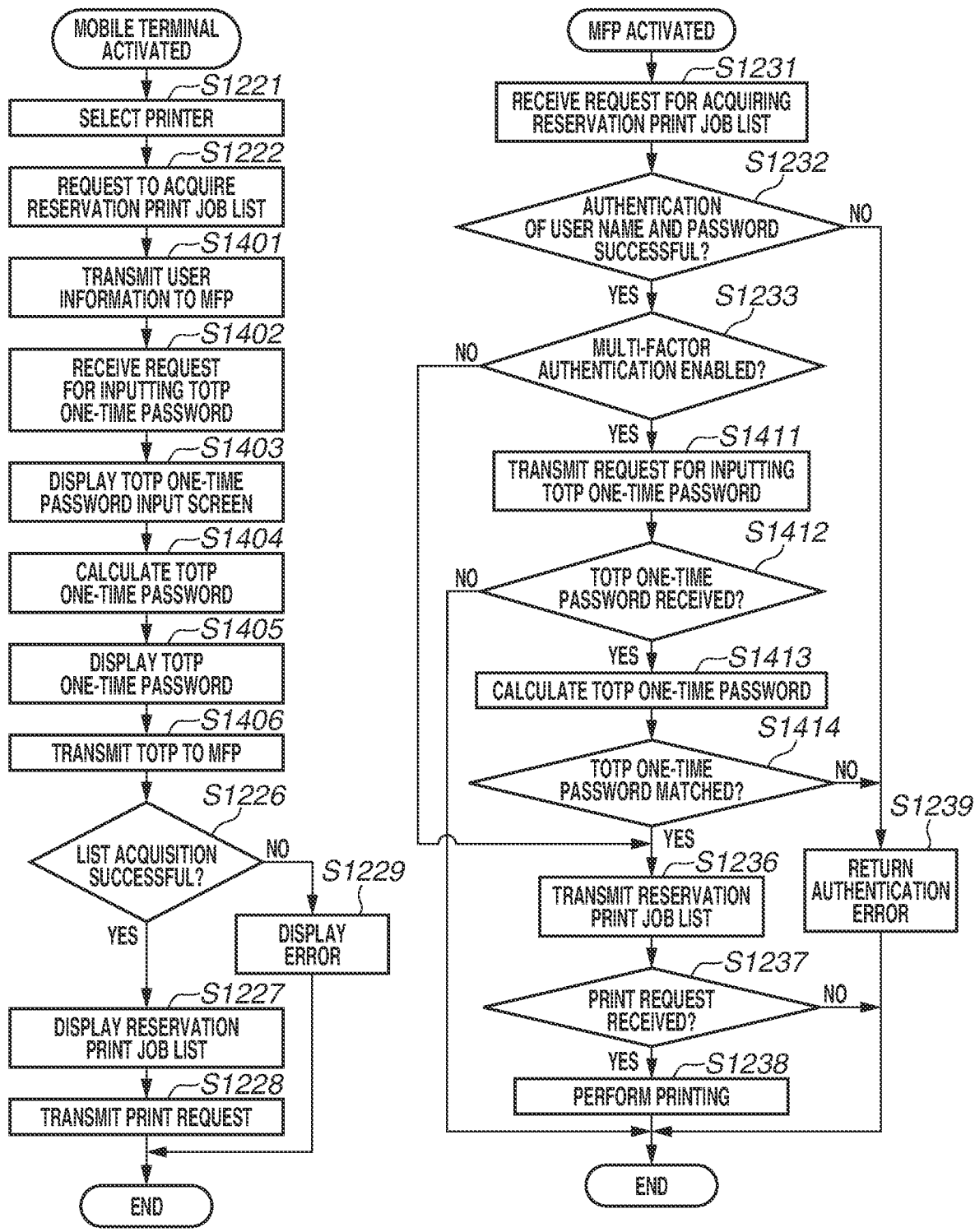
FIG. 14 is a flowchart illustrating a flow of operation in executing printing on the MFP from the mobile terminal according to the second exemplary embodiment.

A second exemplary embodiment will be described below with reference to FIGS. 13 and 14.

In the first exemplary embodiment, the description has been given on the case that, to instruct the MFP 101 to perform printing, the mobile terminal 104 calculates the TOTP secret upon acquisition of the reservation print job list via the function selection screen 1102 and transmits the TOTP secret to the MFP 101 together with the user name and the password in step S1225.

The second exemplary embodiment will be described below centering on a case where, when the mobile terminal 104 transmits a request for acquiring a reservation job list in step S1222, the mobile terminal 104 transmits only the user name and the password to the MFP 101 in step S1401.

Processing according to the second exemplary embodiment will be described below with reference to FIG. 14. Processing that has been described above in the first exemplary embodiment is assigned the same reference numerals, and redundant descriptions thereof will be omitted. In step S1231, the user authentication service 303 of the MFP 101 receives a request for acquiring a reservation print job list from the mobile terminal 104. In step S1232, the user authentication service 303 performs authentication based on the user name and the password with reference to the user information table (Table 4). In a case where the authentication is successful (YES in step S1232), then in step S1233, the user authentication service 303 confirms whether the multi-factor authentication is enabled in the UI 401. In a case where the multi-factor authentication is enabled (YES in step S1233), then in step S1411, the MFP 101 transmits a request to input a one-time password to the mobile terminal 104.

In step S1402, the mobile terminal 104 receives the request to input a one-time password from the MFP 101. In step S1403, the mobile terminal 104 displays a screen 1302 for inputting a one-time password.

According to the first exemplary embodiment, the MFP control application 313 of the mobile terminal 104 internally and automatically generates a one-time password. According to the second exemplary embodiment, a one-time password is input only when an input request is received from the MFP 101. When the user presses a "confirm" button at the bottom of the screen 1302, then in step S1404, the mobile terminal 104 calculates a one-time password based on the current time and the TOTP secret for devices for which the TOTP secret has already been registered in the device information list (Table 5). In step S1405, the mobile terminal 104 displays the one-time password. When the user inputs the displayed number in the screen 1302, then in step S1406, the mobile terminal 104 transmits the input one-time password to the MFP 101. The TOTP one-time password displayed in a screen 1303 can also be used to input a TOTP one-time password in the one-time password input screen 802 in the remote UI login.

In step S1412, the user authentication service 303 of the MFP 101 receives the TOTP one-time password from the mobile terminal 104. In step S1413, the user authentication service 303 calculates a TOTP one-time password based on the TOTP secret in the user information table (Table 4) and the current time of the MFP 101. The method for calculating the one-time password conforms to the TOTP generation algorithm prescribed in RFC6238, as described above. In step S1414, the MFP 101 confirms whether the TOTP one-time password calculated by the MFP 101 coincides with the TOTP one-time password received from the mobile terminal 104. In a case where the two TOTP one-time passwords match each other (YES in step S1414), then in step S1236, the MFP 101 transmits the reservation print job list of the user to the mobile terminal 104. On the other hand, in a case where the two TOTP one-time passwords do not match each other (NO in step S1414), then in step S1239, the MFP 101 returns information about an authentication error to the mobile terminal 104. Then, the processing in the flowchart is ended. The processing flow for performing printing based on the reservation print job list is similar to that according to the first exemplary embodiment, and descriptions of the subsequent flow of processing will be omitted. These are the descriptions of the second exemplary embodiment.

Effect of Second Exemplary Embodiment

As described above, the first and the second exemplary embodiments are different in that the TOTP one-time password is internally and automatically generated or generated in response to a user operation. The method according to the second exemplary embodiment can provide the multi-factor authentication method for the user who desires to access the image forming apparatus (MFP) 101 from the mobile terminal 104 and therefore the present exemplary embodiment can provide an apparatus having security features against cyber attacks.

Some embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-136105, which was filed on Aug. 24, 2021 and which is hereby incorporated by reference herein in its entirety.

What is claimed is:

1. A control method for controlling a mobile terminal that communicates with an image forming apparatus, the method comprising:
    transmitting, by the mobile terminal, a request for acquiring a reservation print job list and user information to the image forming apparatus;
    after transmitting the request for acquiring the reservation print job list and the user information, receiving, by the mobile terminal, a request for inputting a one-time password as a response to the request for acquiring the reservation print job list from the image forming apparatus;
    after receiving the request for inputting a one-time password, receiving, by the mobile terminal, a user instruction to generate a one-time password;
    in response to receiving the user instruction by the mobile terminal, generating, by the mobile terminal, a one-time password based on calculations comprising secret information and time information comprising a time at which the user instruction was received by the mobile terminal, wherein the secret information is managed by the image forming apparatus and has been acquired by the mobile terminal by reading a two-dimensional code displayed on the image forming apparatus;
    transmitting the generated one-time password from the mobile terminal to the image forming apparatus; and
    receiving, by the mobile terminal, the reservation print job list in response to success of authentication based on the generated one-time password in the image forming apparatus, and requesting printing of a print job selected by a user from the reservation print job list.

2. The control method according to claim 1, further comprising managing the secret information.

3. The control method according to claim 1, wherein the secret information is a random number uniquely generated with respect to the user information by the image forming apparatus.

4. The control method according to claim 1, wherein the one-time password does not indicate the secret information and does not indicate the time at which the user instruction was received.

5. The control method according to claim 1, wherein the controlling includes:
    displaying the reservation print job list; and
    transmitting a request to print the print job in response to a user operation that selects the print job on the displayed reservation print job list.

6. The control method according to claim 5,
    wherein the user information includes a user identifier (ID), and
    wherein the print job is managed in association with the user ID by the image forming apparatus.

7. The control method according to claim 5, wherein, when print processing is started in response to the request to print the print job, the image forming apparatus displays a message notifying that the print processing is currently being executed.

8. The control method according to claim 1, further comprising notifying, upon occurrence of an error in authentication processing, the user of the occurrence of the error.

9. The control method according to claim 1, further comprising displaying the one-time password.

10. The control method according to claim 9,
wherein the control method is a method for controlling the mobile terminal that communicates with a first and a second image forming apparatus,
wherein, in the displaying, a first one-time password managed in association with the first image forming apparatus and a second one-time password managed in association with the second image forming apparatus are displayed.

11. The control method according to claim 1,
wherein requesting printing of the print job is performed in response to a user operation received by the mobile terminal.

12. The control method according to claim 1, further comprising:
managing the user information and the secret information;
generating a second one-time password based on the secret information; and
comparing the one-time password with the second one-time password.

13. A non-transitory storage medium storing computer-executable instructions for causing a computer to control a mobile terminal to perform operations that include:
transmitting a request for acquiring a reservation print job list and user information to an image forming apparatus;
after transmitting the request for acquiring the reservation print job list and the user information, receiving a request for inputting a one-time password as a response to the request for acquiring the reservation print job list from the image forming apparatus;
after receiving the request for inputting a one-time password, receiving a user instruction to generate a one-time password;
in response to receiving the user instruction, generating a one-time password based on calculations comprising secret information and time information comprising a time at which the user instruction was received,
wherein the secret information is managed by the image forming apparatus and has been acquired by the mobile terminal by reading a two-dimensional code displayed on the image forming apparatus;
transmitting the one-time password to the image forming apparatus; and
receiving the reservation print job list in response to success of authentication based on the generated one-time password in the image forming apparatus, and requesting printing of a print job selected by a user from the reservation print job list.

14. A mobile terminal that communicates with an image forming apparatus, the mobile terminal comprising:
one or more memories; and
one or more processors that communicate with the one or more memories to cause the mobile terminal to:
transmit a request for acquiring a reservation print job list and user information to the image forming apparatus;
after transmitting the request for acquiring the reservation print job list and the user information, receive a request for inputting a one-time password as a response to the request for acquiring the reservation print job list from the image forming apparatus;
after receiving the request for inputting a one-time password, receive a user instruction to generate a one-time password;
in response to receiving the user instruction, generate a one-time password based on calculations comprising the secret information and time information comprising a time at which the user instruction was received by the mobile terminal, wherein the secret information is managed by the image forming apparatus and has been acquired by the mobile terminal by reading a two-dimensional code displayed on the image forming apparatus;
transmit the one-time password to the image forming apparatus; and
receive the reservation print job list in response to success of authentication based on the generated one-time password in the image forming apparatus, and request printing of a print job selected by a user from the reservation print job list.

* * * * *